United States Patent [19]
Okuma et al.

[11] Patent Number: 5,158,156
[45] Date of Patent: Oct. 27, 1992

[54] LINEAR MOTOR ELEVATOR WITH SUPPORT WINGS FOR MOUNTING SECONDARY SIDE MAGNETS ON AN ELEVATOR CAR

[75] Inventors: Shigeru Okuma; Takeshi Furuhashi, both of Nagoya; Hiroyuki Ikejima; Toshiaki Ishii, both of Inazawa, all of Japan

[73] Assignee: Mitsubishi Denki Kabushiki Kaisha, Japan

[21] Appl. No.: 696,958

[22] Filed: May 8, 1991

[30] Foreign Application Priority Data

May 14, 1990 [JP] Japan .................. 2-123648

[51] Int. Cl.$^5$ ............................................. B66B 11/04
[52] U.S. Cl. ...................................... 187/17; 187/112; 318/135
[58] Field of Search ............... 187/112, 100, 17, 28; 318/135, 687

[56] References Cited

U.S. PATENT DOCUMENTS

| | | | |
|---|---|---|---|
| 4,779,538 | 10/1988 | Fujiwara et al. | 104/282 |
| 4,839,543 | 6/1989 | Beakley et al. | 310/12 |
| 5,033,588 | 7/1991 | Nakai et al. | 187/112 |

FOREIGN PATENT DOCUMENTS

| | | | |
|---|---|---|---|
| 9009948 | 3/1989 | European Pat. Off. | 187/112 |
| 3422374 | 12/1985 | Fed. Rep. of Germany. | |
| 3743101 | 11/1989 | Fed. Rep. of Germany. | |
| 271381 | 10/1989 | Japan | 187/112 |

Primary Examiner—Robert P. Olszewski
Assistant Examiner—Kenneth Noland
Attorney, Agent, or Firm—Leydig, Voit & Mayer

[57] ABSTRACT

A linear motor elevator includes permanent magnets 4 mounted on a pair of wing-shaped support members 21 secured on and projecting sideways from the right and the left side walls 3a of the elevator car 3. The polar axes of the permanent magnets 4 are arranged in the direction of the thickness of the support members 21, such that both the north and the south poles of the permanent magnets 4 are exposed on the front and the back surface of the support members 21 and hence are utilized effectively for producing driving force (thrust) for the elevator car 3. Each one of the right and the left side coils 20a and 20b of the primary side coils 20 for forming vertically translating magnetic field is bent at the middle to form two horizontally extending branches, such that the primary side coils 20 sandwich the permanent magnets 4 across predetermined gaps in the direction of polar axes of the permanent magnets 4, when the elevator car 3 passes by the primary side coils 20. Thus, the strong attractive force acting on the permanent magnets 4 from the primary side coils 20 does not act on the cage structure of the elevator car 3.

6 Claims, 2 Drawing Sheets

LINEAR MOTOR ELEVATOR WITH SUPPORT WINGS FOR MOUNTING SECONDARY SIDE MAGNETS ON AN ELEVATOR CAR

BACKGROUND OF THE INVENTION

This invention relates to linear motor elevators, and more particularly to linear motor elevators by which an elevator car is hoisted up and down by means of a linear synchronous motor within a hoist way (shaft).

FIG. 2 is a schematic perspective view of a ropeless linear motor elevator which has recently been developed. On the interior side walls of a hoist way 1 are disposed a multitude of primary side coils 2, which are arranged repeatedly in the order of U-, V-, and W- phases. For simplicity, FIG. 2 shows only one of the primary side coils 2.

The hoisted body or elevator car 3 hoisted within the hoist way 1 is provided on both sides thereof a plurality of rows of permanent magnets 4, which oppose as the secondary side magnets the primary side coils 2 of the linear motor. Each horizontal row of permanent magnets is divided into four magnet parts 4a through 4d, two each being fixed to the right and left side walls of the elevator car 3. In each row, the magnets 4a through 4d are attached on the elevator car 3 in such a manner that the polarities of the third magnet 4c and the fourth magnet 4d agree with those of the first magnet 4a and the second magnet 4b, respectively. As shown in FIG. 2, the polarities of the first magnet 4a and the second magnet 4b are opposite, and the polarities of the permanent magnets 4 alternate in each column (i.e., vertically).

The primary side coils 2 are each coupled to a power source at the center thereof. A linear synchronous motor is constituted by the primary side coils 2 and the permanent magnets 4 mounted on the elevator car 3. Each one of the primary side coils 2 forms a loop which is twisted 180 degrees at positions between the first magnet 4a and the second magnet 4b and between the third magnet 4c and the fourth magnet 4d. Thus, the linear motor is the null-flux type, and the primary side coils 2 also serve as a guide means for guiding the elevator car 3 in the X- and Y- directions.

The method of operation of the linear motor elevator of FIG. 2 is as follows. Upon receiving a start command signal, a converter device (not shown) such as the VVVF device supplies an excitation current to the primary side coils 2. The primary side coils 2 are excited and a magnetic field moving vertically along the hoist way 1 is generated. The thrust or the driving force generated by the linear synchronous motor along the Z-axis hoists the elevator car 3 up and down along the hoist way 1.

When the elevator car 3 reaches a destination floor 5, the excitation current supplied from the converter to the primary side coils 2 is shut off and the elevator car 3 is stopped by means of a breaking device (not shown).

If the elevator car 3 is displaced in the X- or the Y-direction during hoisting, a circulating current which offsets the variation of the magnetic flux entailed by the displacement of the elevator car 3 flows through the primary side coils 2. Thus, a force is generated which adjusts the elevator car 3 to the central position within the hoist way 1. This compensation for spatial displacement is referred to as the null-flux method. Accordingly, the primary side coils 2 serve not only for hoisting the elevator car 3 but also for guiding the elevator car 3 in the horizontal directions.

The above recently-developed null-flux type ropeless linear motor elevator has the following disadvantage.

(a) The forces acting on the elevator car 3 include not only the driving force along the Z-axis but also subsidiary forces, including, in particular, the strong attractive forces along the Y-axis. Thus, the elevator car 3 must be provided with sufficient structural strength for endure these strong attractive forces with a safe margin. As a result, the elevator car 3 becomes heavy.

(b) Further, only one side of the permanent magnets 4 is utilized effectively for generating the driving force. Thus, the permanent magnets 4 become heavier.

(c) As a result of (a) and (b), the linear synchronous motor and the associated devices therefor, such as the power source and the converter, become large. The overall dimension of the linear motor elevator thus becomes large and the installation cost increases.

(d) In addition, the consumption of power is excessive.

(e) The permanent magnets 4 are fixed directly on the side walls of the elevator car 3. This makes the production and the installation of the elevator car 3 difficult to perform.

SUMMARY OF THE INVENTION

It is therefore an object of this invention to provide a linear motor elevator by which the subsidiary horizontal forces do not act directly on the structure of the elevator car and thus: (a) the structural strength of the elevator car and hence the weight of the elevator car can safely be reduced; (b) both pole surfaces of the secondary side magnets are utilized effectively for generating the driving force, thereby reducing the weight of the magnets attached on the elevator car; (c) the parts of the linear motor are rendered smaller and less expensive; (d) the consumption of power is reduced; and (e) the production and the installation of the elevator car are facilitated.

The above objects are accomplished in accordance with the principle of this invention by a linear motor elevator which comprises: at least one wing-shaped support member secured on and projecting sideways from a side wall of the hoisted body (such as the elevator car); secondary side magnets of said linear synchronous motor attached on said support member such that polar axes of the secondary side magnets are arranged along a direction of thickness of said wing-shaped support member; and primary side coils secured on an interior side wall of the hoist way along a whole hoisting path, wherein each primary side coil sandwiches said secondary side magnets across predetermined gaps in the direction of polar axes of the secondary side magnets when the hoisted body passes by the primary side coil, the primary side coils generating a magnetic field moving along the hoist way to drive the hoisted body within the hoist way.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
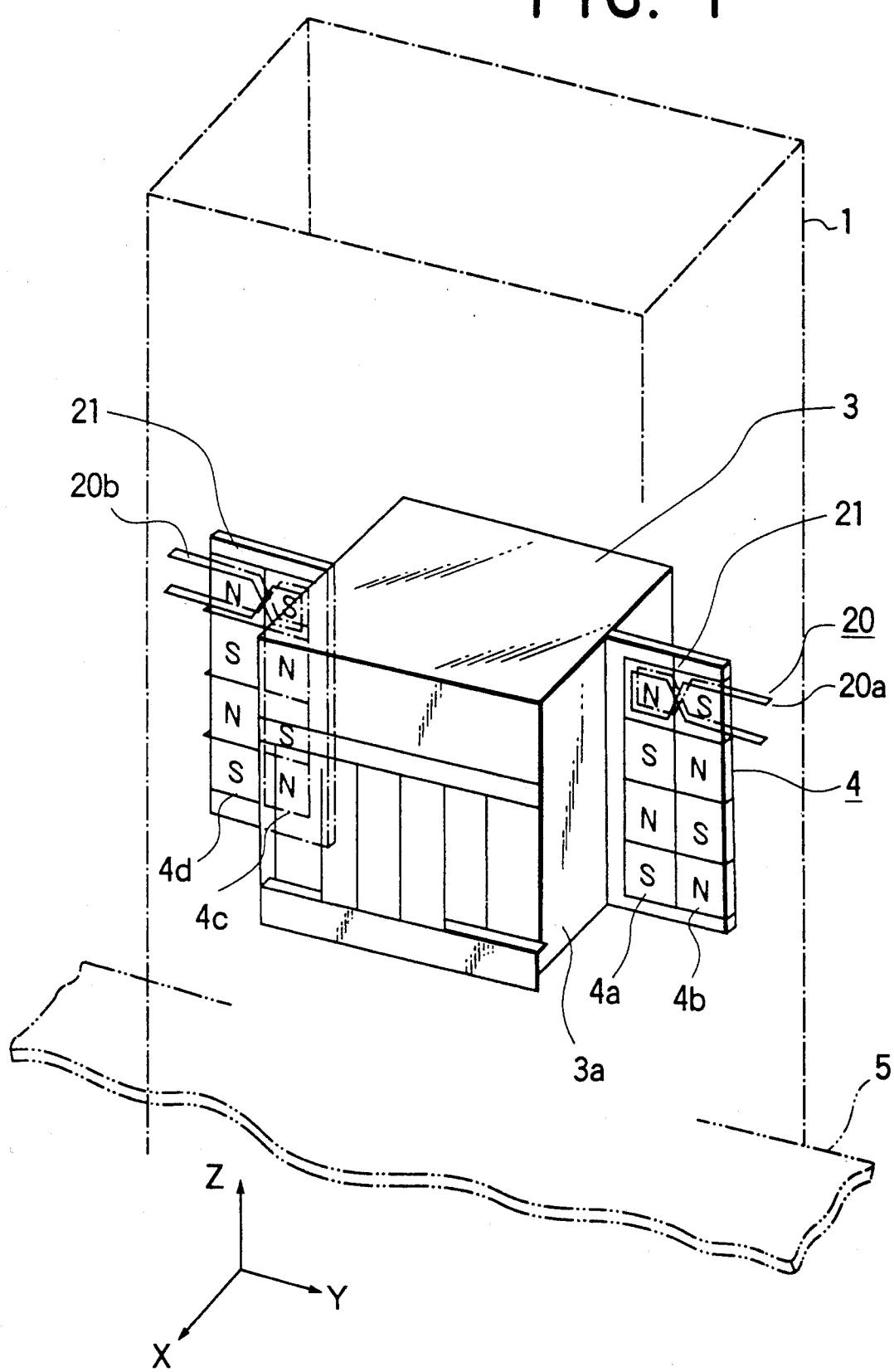
FIG. 1 is a schematic perspective view of a ropeless linear motor elevator according to this invention.
Figure 2:
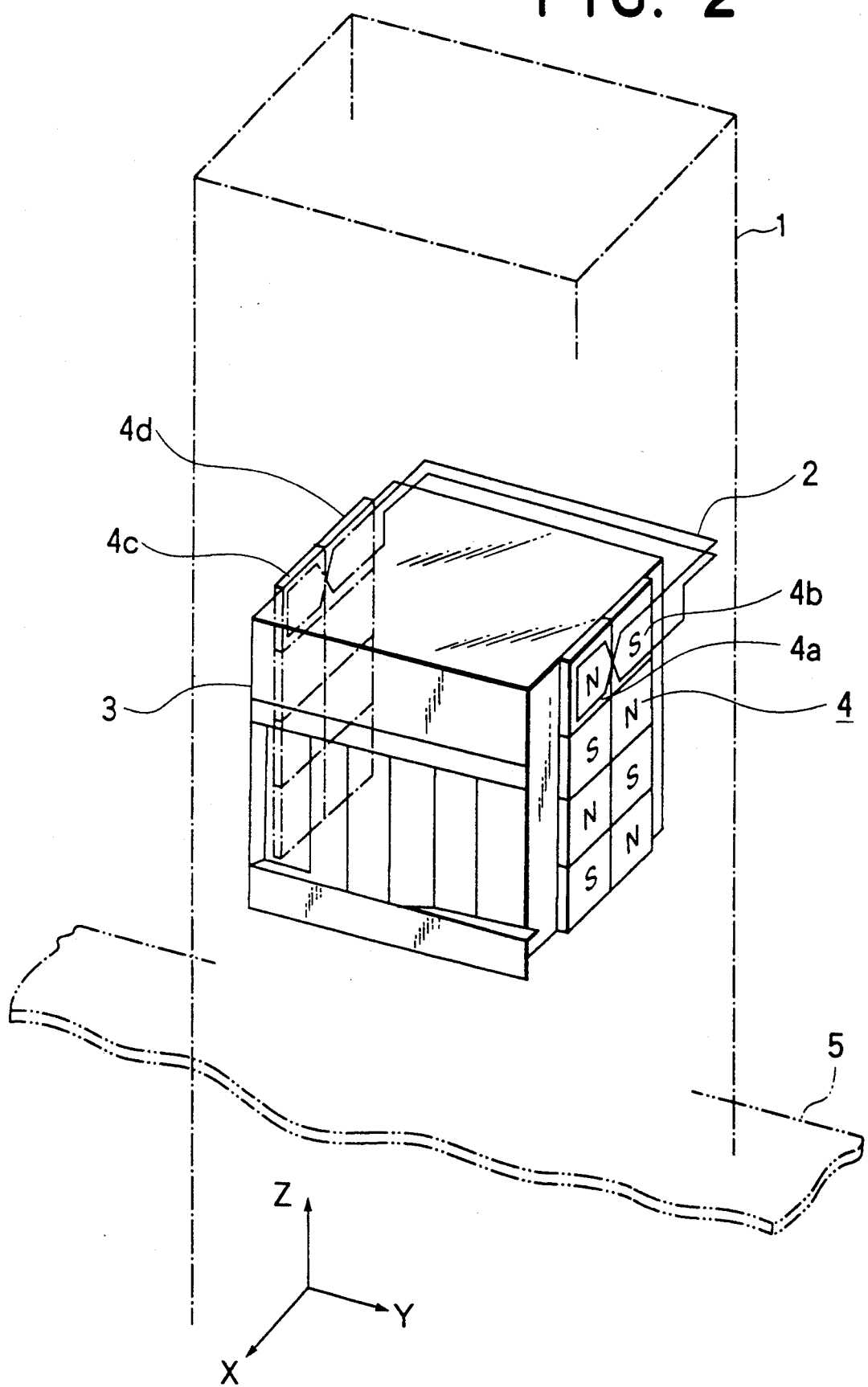
FIG. 2 is a schematic perspective view of a null-flux type ropeless linear motor elevator.

FIG. 1 is a schematic perspective view of a ropeless linear motor elevator according to this invention. The parts common to those of FIG. 2 are represented by the same reference numerals, and their description may be omitted below.

In FIG. 1, a plurality of permanent magnets 4, constituting the secondary side magnets of the linear synchronous motor, are mounted on a pair of wing-shaped support members 21 fixedly secured on and projecting sideways from the right and left side walls 3a of the elevator car 3. The direction of the polar axes of the permanent magnets 4 agree with the direction of thickness of the support members 21, such that the north and the south pole surfaces of the permanent magnets 4 are exposed on the front and the back surface of the support members 21. As in the conventional case, each horizontal row of the permanent magnets 4 is divided into four parts, wherein the first magnet 4a and the second magnet 4b are attached to the right wing support member 21 and the third magnet 4c and the fourth magnet 4d are attached to the left wing support member 21. The polarities of the first through fourth magnets 4a through 4d alternate from left to right. Further, as shown in the figure, the polarities of the permanent magnets 4 alternate in each column (i.e., vertically).

Further, a multitude of primary side coils 20, which are arranged repeatedly in the order of U- V- and W- phases along the whole hoist way 1, are divided into right side coils 20a and left side coils 20b. For simplicity, only a U-phase coil of the primary side coils 20 is shown in the figure. The primary side coils 20 are supplied with a three-phase power from a converter (not shown), such that a magnetic field moving vertically along the hoist way 1 is generated.

The loop-shaped right side coils 20a are each bent at the middle to form two horizontally extending branches which oppose across predetermined gaps the front and the back surface of the right wing support member 21, respectively. Each branch of the right side coils 20a are twisted 180 degrees at the position between the first magnet 4a and the second magnet 4b. Likewise, the loop-shaped left side coils 20b are each bent at the middle to form two branches which oppose the front and the back surface of the left wing support member 21, respectively. Each branch of the left side coils 20b are twisted 180 degrees at the position between the first magnet 4a and the second magnet 4b. The primary side coils 20 thus sandwich the permanent magnets 4 across predetermined gaps in the direction of polar axes of the permanent magnets 4 when the elevator car 3 passes by.

Due to the twists formed in each loop, the primary side coils 20 guide the elevator car 3 in accordance with the null flux method, such that the horizontal displacement of the elevator car 3 is automatically corrected. The elevator car 3 is hoisted up and down along the hoist way 1 via the driving force generated by the linear synchronous motor consisting of the primary side coils 20 and the permanent magnets 4. Both the north and the south pole surfaces of the plate-shaped permanent magnets 4 oppose branches of the primary side coils 20 when the elevator car 3 passes by. Thus, both pole surfaces of the permanent magnets 4 are utilized effectively for generating the driving force for the elevator car.

The strong attractive forces acting on the permanent magnets 4 from the primary side coils 20 act in the direction of thickness of the support members 21 (in the direction of the polar axes of the permanent magnets 4). These strong attractive forces acting on the permanent magnets 4 in the direction of thickness of the support members 21 do not act on the cage or box structure of the elevator car 3. Thus, the mechanical strength of the elevator car 3 can be reduced compared with the conventional case, and hence the weight of the elevator car 3 can be reduced. Further, thanks to the effective utilization of both polar surfaces, the weight of the permanent magnets 4 can be reduced. As a result, the whole device, including the linear motor and the converter and the power source equipment for driving the linear motor, can be rendered small-sized and less expensive. The power consumption is also reduced.

Further, it is noted that since the permanent magnets 4 are attached on the support members 21, the production of the cage structure of the elevator car 3 and that of the support members 21 with the permanent magnets 4 can be separated from each other. This facilitates the production and the installment of the elevator car 3.

In the above embodiment, the permanent magnets are utilized as the secondary side magnets. However, the secondary side magnets may be made of electromagnets. Further, the above embodiment shows the case of a ropeless linear motor elevator. However, the principle of this invention applies to roped-type linear motor elevator as well. In such case, the mounting structure of the permanent magnets 4 on the hoisted body via wing-shaped support members 21 according to this invention may be utilized on the counter weight (which balances the weight of the elevator car via a rope wound around a pulley or sheave to suspend the elevator car and the counter weight at respective ends thereof) as well as on the elevator car.

Furthermore, the above embodiment shows the case where the elevator car 3 is guided in accordance with the null flux method. However, this invention also applies to the case where the elevator car is guided via guide rails.

Still further, the above embodiment shows the case where the support members 21 are erected on both the right and the left side walls 3a of the elevator car 3. However, the support members 21 for carrying the permanent magnets 4 thereon may be secured only on one of the side walls 3a, or on the back side wall of the elevator car 3, to project therefrom.

Still further, in the above embodiment, the support members 21 are projected at right angles from the side walls 3a of the elevator car 3 such that the pole surfaces of the permanent magnets 4 are perpendicular to the side walls 3a. However, the support members may project at an acute angle from the side walls 3a, such that the pole surfaces thereof form an acute angle with the side walls 3a.

What is claimed is:

1. A linear motor elevator device for hoisting a hoisted body up and down along a hoist way by means for a linear synchronous motor, comprising:

at least one wing-shaped support member secured on and projecting sideways from a side wall of said hoisted body;

secondary side magnets of said linear synchronous motor attached on said support member such that polar axes of the secondary side magnets are arranged along a direction of thickness of said wing-shaped support member; and primary side coils secured on an interior side wall of said hoist way along a whole hoisting path, said primary coils defined by at least one loop, wherein each primary side coil sandwiches said secondary side magnets across predetermined gaps in the direction of polar axes of the secondary side magnets when the hoisted body passes by the primary side coil and each loop is bent to form branches which oppose said secondary side magnets across respective predetermined gaps in the direction of polar axes of secondary side magnets, the primary side coils generating a magnetic field moving along the hoist way to drive the hoisted body within the hoist way.

2. A linear motor elevator device as claimed in claim 1, wherein said hoisted body comprises an elevator car.

3. A linear motor elevator device as claimed in claim 1, wherein said hoisted body comprises a counter weight balancing an elevator car via a rope which is wound around a pulley to suspend the counter weight and the elevator car at respective ends thereof.

4. A linear motor elevator device as claimed in claim 1, wherein said secondary side magnets comprise permanent magnets.

5. A linear motor elevator device as claimed in claim 1, wherein said secondary side magnets comprise electromagnets.

6. A linear motor elevator device for hoisting a hoisted body up and down along a hoist way by means of a linear synchronous motor, comprising:

at least one wing-shaped support member secured on and projecting sideways from a side wall of said hoisted body;

secondary side magnets of said linear synchronous motor attached on said support member such that polar axes of the secondary side magnets are arranged along a direction of thickness of said wing-shaped support member; and primary side coils secured on an interior side wall of said hoist way along a whole hoisting path, wherein each primary side coil sandwiches said secondary side magnets across predetermined gaps in the direction of polar axes of the secondary side magnets when the hoisted body passes by the primary side coil, whereby said primary side coils generate a magnetic field to drive the hoisted body within the hoist way and said secondary side magnets generate a force which compensates for horizontal displacement of the hoisted body in accordance with the null-flux method.

* * * * *